United States Patent [19]

Auerbach et al.

[11] Patent Number: 5,300,362

[45] Date of Patent: Apr. 5, 1994

[54] POLYARYLENE SULFIDE COATED WIRE

[75] Inventors: Andrew Auerbach, Essex; Joseph Tajar, Somerset; Marvin Wilson, Morris, all of N.J.

[73] Assignee: Hoechst Celanese Corporation, Somerville, N.J.

[21] Appl. No.: 960,302

[22] Filed: Oct. 13, 1992

Related U.S. Application Data

[63] Continuation of Ser. No. 615,860, Nov. 20, 1990, abandoned.

[51] Int. Cl.$^5$ ............................................. D02G 3/00
[52] U.S. Cl. ................................. 428/375; 428/378; 428/379; 428/391; 174/1105 R; 525/92
[58] Field of Search ............... 428/379, 389, 378, 375, 428/419, 391; 174/1108 R, 110 E; 525/92

[56] References Cited

U.S. PATENT DOCUMENTS

| | | | |
|---|---|---|---|
| 3,616,186 | 10/1971 | Blackwell | 161/187 |
| 4,021,596 | 5/1977 | Bailey | 428/375 |
| 4,251,575 | 2/1981 | Brady et al. | 528/388 |
| 4,274,993 | 6/1981 | Narisawa et al. | 528/388 |
| 4,394,417 | 7/1983 | Hilker | 428/379 |
| 4,436,865 | 3/1984 | Beever | 525/92 |
| 4,451,607 | 5/1984 | Garcia et al. | 525/92 |
| 4,476,284 | 10/1984 | Cleary | 525/92 |
| 4,487,879 | 12/1984 | Needham | 525/92 |
| 4,489,129 | 12/1984 | Shue et al. | 428/378 |
| 4,529,769 | 7/1985 | Johnson et al. | 524/413 |
| 4,748,169 | 5/1988 | Izutsu et al. | 525/92 |
| 4,985,499 | 1/1991 | Nishikawa et al. | 525/92 |

FOREIGN PATENT DOCUMENTS

| | | | |
|---|---|---|---|
| 407216 | 1/1991 | European Pat. Off. | |
| 62-143307 | 6/1987 | Japan . | |
| 63-118369 | 5/1988 | Japan . | |
| 0309207 | 12/1989 | Japan | 174/1108 R |
| 02-215861 | 8/1990 | Japan | 525/92 |
| 3-91562 | 4/1991 | Japan . | |

*Primary Examiner*—Patrick J. Ryan
*Assistant Examiner*—J. M. Gray
*Attorney, Agent, or Firm*—Depaoli & O'Brien

[57] ABSTRACT

A coated wire is provided which comprises a wire coated with a blend of polyarylene sulfide and an ungrafted, hydrogenated conjugated diene/vinyl aromatic block copolymer which imparts improved elongation to polyarylene sulfide.

19 Claims, No Drawings

POLYARYLENE SULFIDE COATED WIRE

This application is a continuation of application Ser. No. 07/615,860, filed Nov. 20, 1990, now abandoned.

BACKGROUND OF THE INVENTION

This invention relates to coated wire and, in particular, to a wire coated with a substantially concentric coating of a normally solid polyarylene sulfide resin composition having improved impact strength and elongation.

Polyarylene sulfide (PAS) resins are attracting attention as high-performance engineering plastics having higher heat resistance, chemical resistance and rigidity than usual engineering plastics such as polycarbonate, polyacetal, nylon and polybutylene terephthalate. Most of these desirable properties are found when PAS is sufficiently crystallized. A relatively recent development has been the use of polyrarylene sulfide compositions such as, for example, polyphenylene sulfide (PPS) compositions, for molding electronic components and as encapsulating materials for electronic components. These compositions typically comprise glass fiber-reinforced polyarylene sulfide. Electronic components are molded or otherwise encapsulated to maintain electrical insulation, to provide mechanical protection and to otherwise shield the metallic components from exposure to the environment.

Polyphenylene sulfide is useful in electronic applications such as in the formation of circuit boards, connectors and the like since polyphenylene sulfide can withstand the temperatures of vapor phase soldering which temperatures often are above 220° without adversely affecting the properties of the molded resin such as blistering or dimensional distortion. Unfortunately, although polyphenylene sulfide has the necessary thermal stability for electronic applications, the material is relatively brittle and, thus, has low impact strength. Moveover, when PPS is crystallized such as by a thermal curing treatment, the elongation thereof is sharply reduced and, thus, the PPS lacks the ability to stretch and is not very tear resistant. Accordingly, PAS is unsuitable for the heat-resistant coating of electric wires to which high elongation is required.

It is known to improve the impact strength of polyarylene sulfide by the addition of elastomeric materials thereto. Thus, U.S. Pat. No. 4,581,411 discloses improving the impact strength of polyarylene sulfide and glass-reinforced polyarylene sulfide by adding from about 0.1 to about 40 wt. % of a polymeric rubber which is selected from among silicon rubber, ethylene-acrylic rubber, ethylene-propylene rubber, ethylene-propylene-diene rubber, and poly(butylacrylate) rubber. It is also disclosed that further enhancement of the impact strength of the composition can be achieved when using either the silicon rubber or the poly(butylacrylate) rubber by adding small amounts of an organosilane.

U.S. Pat. No. 4,476,284 discloses polyarylene sulfide compositions which have improved physical properties including impact resistance and flexural modulus by forming the polyarylene sulfide in the presence of a thermoplastic elastomeric hydrogenated conjugated diene/monovinyl arene block polymer. The preferred hydrogenated conjugated diene/monovinyl aromatic block copolymers are isoprene/styrene or butadiene/styrene block copolymers with total average molecular weights on the order of about 25,000-500,000, preferably from about 35,000 to about 300,000. The patent discloses that the desirable effects of the invention are found in the presence of any amount up to and over about 30% of the hydrogenated block copolymer with the preferred range being disclosed as from about 1-5% by weight. While impact strength and the flexural modulus of the PPS resin are improved by the addition of the hydrogenated copolymer, elongation is essentially unchanged or degraded relative to a PPS control without the copolymer.

U.S. Pat. No. 4,451,607 discloses increasing the crystallinity of polyarylene sulfide by blending therewith hydrogenated conjugated diene/monovinyl aromatic block copolymer in an amount up to about 5% by weight. No discussion is rendered relative to the elongation of the blend.

U.S. Pat. No. 4,628,072 discloses improving various properties of many kinds of thermoplastic polymers, including polyarylene sulfide, by addition thereto of partially hydrogenated block copolymers of a monovinyl substituted aromatic hydrocarbon polymer and an olefin polymer block. The block copolymer has grafted thereto a unit containing a carboxylic acid group or derivative thereof. In Table 20 of the patent, blends of PPS and grafted, hydrogenated block copolymer were tested for impact strength, gloss, weatherability and resistance to heat aging relative to PPS blends containing ungrafted and hydrogenated ungrafted block copolymer. Again, no mention is made of the elongation properties of PPS.

None of the above cited patents are directed to specific articles made from polyarylene sulfide or PPS, in particular. In U.S. Pat. No. 4,880,679, there is disclosed an article which provides effective electromagnetic interference (EMI) shielding. In particular, the patent is concerned with an article which comprises electrically conductive fibers embedded in a thermoplastic matrix material. Many thermoplastic matrices are disclosed although polyarylene sulfide including polyphenylene sulfide are among the preferred materials.

U.S. Pat. No. 3,616,186 discloses laminate structures of a polyarylene sulfide coating composition on copper substrates. The patent is specifically concerned with treating a substrate of copper so as to achieve bonding of a polyarylene sulfide resin thereto. The copper metal substrate used in the invention can be in any shape desired including sheeting, wire, coupons, blanks and the like. Coated wire is described as an especially useful application of the laminate structures of the invention. There is no disclosure in the patent of modifying the polyarylene sulfide so as to improve the elongation thereof.

U.S. Pat. No. 4,921,758 discloses improving the elongation of PAS resins and discloses the use of such resins for coating electrical wires. The patent discloses a process of curing a PAS resin to a specified melt viscosity, melt extruding the PAS resin and taking off the extruded PAS resin at a particular taking off speed and finally crystallizing the resin.

Japanese Patent 63-118369 is directed to a polyphenylene sulfide resin composition. The composition comprises 30-99 parts by weight polyphenylene sulfide, 1-70 parts by weight of a polymer produced by grafting an unsaturated carboxylic acid or derivative to a hydrogenated polymer of a conjugated diene or hydrogenated polymer of a conjugated diene and aromatic vinyl hydrocarbon, and 0.1-20 parts by weight of an epoxy resin. It is disclosed that the polyphenylene sulfide composition has improved resilience including improved impact resistance and pliability. The patent states that while PPS is a known high performance engineering plastic having superior heat and chemical resistance, PPS lacks stretchability and tends to be brittle. There is no disclosure on a particular use of the resin composition other than that such compositions are suitable as materials for injection and extrusion molding for use in many areas.

SUMMARY OF THE INVENTION

It has now been found that the addition of a high molecular weight, ungrafted, hydrogenated, conjugated diene/vinyl aromatic block copolymer to a polyarylene sulfide resin can significantly improve the elongation of the polyarylene sulfide. A polyarylene sulfide resin which contains at least about 5 wt. % of the hydrogenated conjugated diene/vinyl aromatic block copolymer has particular use in coating wire and cable where the wire and cable insulation must have a high elongation to prevent tearing or cracking during the coated wire forming process as well as during installation and use of the wire or cable.

In accordance with this invention, a blend of a polyarylene sulfide resin and a high molecular weight hydrogenated, conjugated diene/vinyl aromatic block copolymer is applied as a concentric coating on wire or cable such as by an extrusion process. The addition of a silane, such as an aminosilane has been found to still further improve the elongation of the PAS blend.

DETAILED DESCRIPTION OF THE INVENTION

The wire substrate which is to be coated with the polyarylene sulfide resin composition according to the present invention can be of any known configuration. Thus, the wire may typically consist of a continuous length single metal strand, a plurality of continuous length single strands wound or otherwise bundled together or in the form of a cable typically consisting of a plurality of bundled strands. The term "continuous length" is meant to distinguish the wires of the present invention from simply chopped fibers which are used as reinforcement in plastic matrices. Further, the polyarylene sulfide resin coating composition of this invention is applied as a substantially concentric coating formed around and in the shape of the wire or cable. The term "concentric coating" is meant to distinguish over articles containing chopped fibers or orientated fibers embedded in a matrix of resin. Especially useful wires are those having good electrical conductivity such as copper or aluminum wire.

POLYARYLENE SULFIDE

Uncured or partially cured polyarylene sulfide polymers whether homopolymer, copolymer, terepolymer, and the like, or a blend of such polymers, can be used in the practice of this invention. The PAS resin is at least partially crystallized prior to use such as by thermal and/or solvent treatment as is known in the art. The uncured or partially cured polymer is a polymer the molecular weight of which can be increased by either lengthening of a molecular chain or by cross-linking or by combination of both by supplying thereto sufficient energy, such as heat. Suitable polyarylene sulfide polymers include, but are not limited to, those described in U.S. Pat. No. Pat. No. 3,354,129, incorporated by reference herein.

Some examples of polyarylene sulfide compositions suitable for the purposes of this invention include poly(2,4-tolylene sulfide), poly(4,4'-biphenylene sulfide) and polyphenylene sulfide. Because of its availability and desirable properties such as high chemical resistance, nonflammability, and high strength and hardness polyphenylene sulfide is the presently preferred polyarylene sulfide. The polyarylene sulfide composition may be a mixture of more than one polyarylene sulfide.

Particularly preferred polyarylene sulfides for use in this invention are disclosed in U.S. Pat. No. 4,645,826, the entire content of which is herein incorporated by reference. As disclosed therein a linear PAS of a markedly high molecular weight with a melt viscosity of about some thousands to some tens of thousands poise can be readily produced without the use of an aid by forming a PAS prepolymer of low to medium molecular weight according to a preliminary polymerization, then elevating the temperature by heating the polymerization system under strongly alkaline conditions with addition of a phase separating agent to the polymerization system, thereby separating the system into two liquid phases of high viscosity phase (polymer solution phase) and low viscosity phase (solvent phase), and carrying out the reaction under such a state.

The two-phase separated polymerization comprises dissolving an arylenesulfide prepolymer having a melt viscosity of 5 to 300 poise (at 310° C., shearing rate=200 (sec) $^{-1}$), in a poor solvent, i.e. water, under a strongly alkaline condition (in a pH range of from 9.5 to 14 of the reaction mixture when diluted 10-fold with water) in a temperature range of from 245° C. to 290° C. into a liquid-liquid two-phase separated state and maintaining this state for 1 to 50 hours to convert the arylenesulfide prepolymer into a high molecular weight polymer, then separating the polymer from the polymerization system and purifying the polymer after neutralization.

The process for production of a high to ultra-high molecular weight PAS according to U.S. Pat. No. 4,645,826 comprises, in general, forming PAS molecules through bonding between an alkali metal sulfide and a dihalo-aromatic compound and/or converting the PAS molecules into a high molecular weight polymer. PPS having melt viscosities of at least 3,000 poise can be produced by the process as disclosed therein including PPS having melt viscosities of at least 7,000 poise and much higher.

The starting materials for producing the prepolymer comprise an alkali metal sulfide, a dihalo-aromatic compound and a polymerization solvent. The alkali metal sulfide used includes lithium sulfide, sodium sulfide, potassium sulfide, rubidium sulfide, cesium sulfide and mixtures thereof. These alkali metal sulfides can be used as hydrates or aqueous mixtures, or in anhydrous forms. Among these alkali sulfides, sodium sulfide is the least expensive and is commercially preferred. It is also possible to use a small amount of an alkali metal hydroxide in combination in order to neutralize an acidic salt (e.g., alkali metal disulfides and alkali bicarbonates) which may sometimes occur in minute amount in an alkali metal sulfide.

The dihalo-aromatic compound used includes any of dihalo-aromatic compounds as disclosed in Japanese Laid-open Patent Publication No. 22926/1984. Particularly preferred are p-dichlorobenzene, m-dichlorobenzene, 2,5-dichlorotoluene, 2,5-dichloro-p-xylene, p-dibromobenzene, 1,4-dichloronaphthalene, 1-methoxy- 2,5-dichlorobenzene, 4,4'-dichlorobiphenyl, 3,5-dichlorobenzoic acid, p,p'-dichlorodiphenylether, p,p'-dichlorodiphensulfone, p,p'-dichlorodiphenylsulfoxide, p,p'-dichlorodiphenylketone, and the like. Among these, those composed mainly of para-dihalobenzene, typically p-dichlorobenzene, are especially preferred.

By appropriate selection and combination of dihaloaromatic compounds, a random or block copolymer containing two or more different reaction units can be obtained. For example, when employing p-dichlorobenzene in combination with m-dichlorobenzene or p,p'dichlorodiphenylsulfone, a random or block copolymer containing:

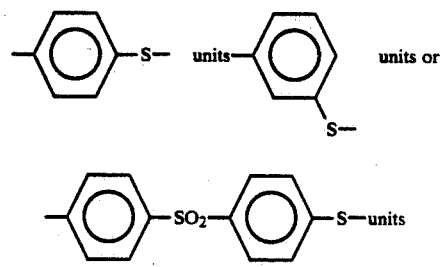

can be obtained. Further, a small amount of a polyhaloaromatic compound (e.g., trichlorobenzene) within the range which may provide some cross-linking but not substantially impair linearity may also be employed in combination, but no such compound is ordinarily required.

An organic amide solvent which is used in the polymerization step can be used for forming the prepolymer and can be selected from N-methylpyrrolidone (NMP), N-ethyl-pyrrolidone, N,N-dimethylformamide, N,N-dimethylacetamide, N-methylcaprolactam, tetramethylurea, hexamethylphosphorotriamide, and mixtures thereof. Among these, N-methylpyrrolidone is particularly preferred from viewpoints such as chemical stability and ability to produce readily a high molecular weight polymer. The organic amide as the polymerization solvent is desirably an aprotic compound. In the polymerization step for forming an ultra-high molecular linear polymer from the prepolymer, the above organic amide can of course be used. Otherwise, it is also possible to employ, for example, aromatic hydrocarbons ($C_6$-$C_{30}$), aliphatic hydrocarbons ($C_6$-$C_{30}$), ethers ($C_6$—$C_{30}$), ketones ($C_5$-$C_{30}$), pyridine or quinoline or derivatives of these ($C_5$-$C_{30}$), and mixtures thereof as such or as mixtures with organic amides.

In practicing the process, first, an alkali metal sulfide and a dihalo-aromatic compound are added into an organic solvent, desirably under an inert gas atmosphere, and the temperature is elevated to a desired temperature at which the reaction is carried out. Here, if the water content in the alkali metal sulfide is less than the desired content, the necessary amount of water is added for supplementation.

The preliminary polymerization is preferably conducted at a temperature in the range of from 160° to 260° C., particularly from 180° to 235° C. At a temperature lower than 160° C., the reaction rate is too slow, while at a temperature over 260° C., the PAS formed is liable to be decomposed to produce only a PAS with extremely low melt viscosity.

The end point of the preliminary polymerization step and the timing of turning from the preliminary polymerization to the two-phase separated polymerization, is preferably the point when the conversion of the dihaloaromatic compound has reached 70 mole % to 98 mole %.

At the point of turning from the preliminary polymerization to the two-phase separated polymerization, the melt viscosity of the PAS is preferably in the range of from 5 to 300 poise. The range of from 10 poise to 200 poise is more suited for obtaining a PAS of a high polymerization degree with a melt viscosity of 1000 poise or higher. With a viscosity less than 5 poise, formation of two-phase separation is insufficient, whereby decomposition of the polymerization system or lowering of the reaction rate will readily occur. With a viscosity over 300 poise, harmful substances will promote polymer cleavage will be accumulated in greater amount, whereby a lowering in polymer yield and decomposition of the polymer system will undesirably be caused.

The polymerization process as described in U.S. Pat. No. 4,645,826 is applicable for not only homopolymerization or random copolymerization but also for block copolymerization. For example, a purified p-phenylene prepolymer and a purified m-phenylene prepolymer can be dispersed in the same polymerization vessel to carry out the two-phase separated polymerization step, whereby a (p-phenylenesulfide)-(m-phenylenesulfide) block copolymer can readily be obtained.

SELECTIVELY HYDROGENATED BLOCK COPOLYMERS

To improve the impact strength and, more importantly, the elongation of polyarylene sulfide, there is added thereto at least 5 wt. %, preferably from about 10 to about 30 wt. %, and, more preferably, about 10 to about 20 wt. % based on the total composition of a high molecular weight selectively hydrogenated block copolymer elastomer.

Block copolymers of conjugated dienes and vinyl aromatic hydrocarbons which may be utilized include any of those which exhibit elastomeric properties and those which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A-B, A-B-A, A-B-A-B, B-A-B, $(AB)_{1,2,3}$ . . . BA and the like wherein A is a polymer block of vinyl aromatic hydrocarbon or a conjugated diene/vinyl aromatic hydrocarbon tapered copolymer block and B is a polymer block of a conjugated diene.

The block copolymers may be produced by any well known block polymerization or copolymerization procedure including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos.

3,251,905; 3,265,765; 3,639,521 and 4,208,356 the disclosures of which are incorporated herein by reference.

Conjugated dienes which may be utilized to prepare the polymers and copolymers are those having from 4 to 8 carbon atoms and include 1,3-butadiene, 2-methyl-1,3-butadiene (isoprene), 2,3-dimethyl,-1,3-butadiene, 1,3-pentadiene, 1,2-hexadiene, and the like. Mixtures of such conjugated dienes may also be used. The preferred conjugated diene is 1,3-butadiene.

Vinyl aromatic hydrocarbons which may be utilized to prepare copolymers included styrene, o-methylstyrene, p-methylstyrene, p-tert-butylstyrene, 1,3-dimethylstyrene, alphamethylstyrene, vinylnaphthalene, vinylanthracene and the like. The preferred vinyl aromatic hydrocarbon is styrene.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

The preferred hydrogenated conjugated diene/vinyl aromatic block copolymers are isoprene/styrene block copolymers or butadiene/styrene block copolymers that can contain up to about 60% by weight of the styrene block, preferably from about 10-50% by weight of the styrene block. Especially preferred are A-B-A block type polymers including styrene/butadiene/styrene, and styrene-isoprene-styrene and styrene-ethylene/butylene-styrene type copolymers. To substantially improve the elongation of the polyarylene sulfide, the hydrogenated block copolymers should have a total average molecular weight on the order of at least about 40,000, preferably from about 40,000 to about 300,000.

The polyarylene sulfide resin composition and blend of the present invention can include other additives which are used in minor amounts relative to the weight of the total composition. These additives include such materials as flow improving agents, inorganic fillers, pigments and stabilizers. A particular useful filler is glass fiber which should be used in only moderate amounts in the present invention to maintain the improved elongation which has been found using the blend of the present invention. Thus, at most, 40 wt. % of the composition should be glass fiber. Other useful fillers include silica and mica.

It has also been found that the addition of a silane compound to the polyarylene sulfide composition of the present invention can enhance the physical properties of the blend including elongation. Thus, the silane which can be used can include one or more alkoxy silanes selected from among aminoalkoxysilane, epoxyalkoxysilane, mercaptoalkoxysilane and vinylalkoxysilane.

The aminoalkoxysilane may be any silane compound as far as it has at least one amino group and two or three alkoxy groups per molecule, and examples thereof include $\gamma$-aminopropyltriethoxysilane, $\gamma$-aminopropyltrimethoxysilane, $\gamma$-aminopropylmethyldiethoxysilane, $\gamma$-aminopropylmethyldimethoxysilane, N-$\beta$(aminoethyl)-$\gamma$-aminopropyltriethoxysilane, N-$\beta$-(aminoethyl)-$\gamma$-aminopropyltrimethoxysilane, N-$\gamma$-(aminoethyl)-$\gamma$-aminopropylmethyldiethoxysilane, N-$\beta$(aminoethyl)-$\gamma$-aminopropylmethyldimethoxysilane, N-phenyl-$\gamma$-aminopropyltriethoxysilane, and N-phenyl-$\gamma$-aminopropyltrimethoxysilane.

The epoxyalkoxysilane may be any silane compound as far as it has at least one epoxy group and two or three alkoxy groups per molecule, and examples thereof include $\gamma$-glycidoxypropyltrimethoxysilane, $\beta$-(3,4-epoxycyclohexyl)ethyltrimethoxysilane, and $\gamma$-glylcidoxypropyltriethoxysilane.

The mercaptoalkoxysilane may be any silane compound as far as it has at least one mercapto group and two or three alkoxy groups per molecule, and examples thereof include $\gamma$-mercaptopropyltrimethoxysilane and $\gamma$-mercaptopropyltriethoxysilane.

The vinylalkoxysilane may be any silane compound as far as it has at least one vinyl group and two or three alkoxy groups per molecule, and examples thereof include vinyltriethoxysilane, vinyltrimethoxysilane and vinyltris($\beta$-methoxyethoxy)silane.

The amount of the above-described alkoxysilane used in the present invention is 5 wt. % or less, preferably 0.1–3 wt. % based on the total weight of the polyarylene sulfide resin blend. When the amount is too small, no significant effect intended in the present invention can be attained, while when the amount is too large, mechanical properties are unfavorably lowered.

The mode of mixing or blending the compositions useful in the present invention include the conventional processes as known in the art. Particularly useful is dry blending using commercial apparatus followed by melt-blending operation of extrusion and pelleting using commercial apparatus.

The process for coating the wire with the concentric coating of the polyarylene sulfide blend of the present invention can also be done in a conventional manner using known commercial extrusion equipment. Typically, the wire or cable is passed through a die in an extrusion device which applies the polyarylene sulfide blend as a molten resinous coating sheath around the wire or cable. The polyarylene sulfide resin which is used may be partially or fully cured prior to coating or may be cured during the coating process. Once coated, the coating is allowed to harden prior to winding the coated wire or cable for packaging, transportation or the like.

The end use of the coated wire or cable can be any typical use which is known for such articles. Such wire as transformer wire or plenum wire or cable have preferred applicability inasmuch as the polyarylene sulfide coating composition of the present invention has improved pliability and tear resistance and will not readily crack or tear during the winding of the coated cable on a mandrel for packaging or shipping or the like, nor will the coating on plenum wire crack as the cable is being installed.

The following examples are illustrative only and are not to be construed as limiting the scope of the invention as claimed.

EXAMPLE 1

The composition of Table 1 was compounded using a 40 mm ZSK co-rotating twin screw extruder made by Werner and Pfleiderer using a melt temperature of 322° C. and a die temperature of 300° C.

Test specimens for physical property evaluations of the formulation were molded on a Boy 22S molding machine at a mold temperature of 80° C. The physical properties determined by standard ASTM methods are shown in Table 1:

TABLE 1

| Component | Amount by Weight |
| --- | --- |
| Fortron 214[1] | 79.2 Parts |
| Kraton G1651[2] | 20.0 |
| Aminosilane A-1100[3] | 0.5 |
| PETS[4] | 0.3 |
| Properties | |
| Tensile Elongation | 154% |
| Tensile Strength - Yield | 6858 psi |
| - Break | 6738 psi |
| Notched Izod Impact - RT —¼" | 1.5 ft. lbs/in. |

[1]PPS, Kureha, Tokyo, Japan
[2]Ungrafted Styrene-ethylene/butylene-Styrene Copolymer, Shell Oil, Houston, TX
[3]Aminopropyltrimethoxysilane, Union Carbide
[4]Pentaerythirtol tetrastearate Test specimens for electrical property evaluations of the formulation were molded on a Battenfeld type BA—C1100/400 CNC molding machine. The tests were run at 73° F. Property data obtained is shown in Table 2:

TABLE 2

| Dielectric Constant at 100 kHz | 3.65 | (3.60) |
| --- | --- | --- |
| Dissipation Factor at 100 kHz | 0.0087 | (0.0088) |
| Volume resistivity ohm-cm | 2.6 E14 | (2.6 E14) |

[1]The value in parentheses is that of the base PPS resin used in the blend.

The blend shown in Table 1 was coated on a copper wire by extrusion to yield a coating thickness of 20 mils. The coated wire was then tested for flammability and the results are shown in Table 3.

TABLE 3

| VW1 Flammability Test - Burn Time | 58 seconds |
| --- | --- |
| Spark Test - 1500 Volts | Passed |
| - 3000 Volts | Passed |

EXAMPLE 2

The formulations set out in Table 4 were compounded on Haake conical twin screw extruder at a die temperature of 300° C. and molded into test bars using a 2 oz. Boy molding machine at a melt temperature of 300° C. and a mold temperature of 80° C. Results are also shown in Table 4.

TABLE 4

|  | SAMPLE NO. | |
| --- | --- | --- |
|  | 1 | 2 |
|  | Amounts by Wt % | |
| Material | | |
| Fortron 214 | 79.7 | 79.2 |
| Kraton G1651 | 20.0 | 20.0 |
| Aminosilane A-1100 | 0.0 | 0.5 |
| PETS | 0.3 | 0.3 |
| Physical Properties | | |
| Elongation % | 57.2 | 147.3 |
| Tensile Strength psi | 5600 | 7863 |
| Flexural Modulus psi | 258,039 | 315,265 |
| Flexural Strength psi | 9,047 | 11,560 |
| ¼" Notched Izod ft. lbs./in. | 1.1 | 1.4 |

As can be seen, the elongation of the polyphenylene sulfide was substantially increased by the addition of the silane (Sample 2).

EXAMPLE 3

The composition shown in Table 5 was extruded on the 40 mm ZSK extruder as in Example 1 and molded on the 2 oz. Boy molding machine at the same conditions as set forth in Example 1.

TABLE 5

|  | Wt % |
| --- | --- |
| Material | |
| Fortron 214 | 79.7 |
| Kraton G1651 | 20.0 |
| Aminosilane A-1100 | 0.0 |
| PETS | 0.3 |
| Physical Properties | |
| Elongation % | 40.6 |
| Tensile Strength psi | 5502 |
| Flexural Modulus psi | 284,068 |
| Flexural Strength psi | 11,736 |
| ¼" Notched Izod ft. lbs./in. | 0.9 |

By comparing Example 3 with Example 1, it can be seen that the addition of the silane substantially increased the elongation of the composition.

EXAMPLE 4

The formulations shown in Table 6 were extruded and molded as set forth in Example 2.

TABLE 6

|  | Sample No. | | |
| --- | --- | --- | --- |
|  | 1 | 2 | 3 |
|  | Amount by Wt % | | |
| Material | | | |
| Fortron 214 | 100.0 | 99.7 | 99.2 |
| Aminosilane A-1100 | 0.0 | 0.0 | 0.5 |
| PETS | 0.0 | 0.3 | 0.3 |
| Physical Properties | | | |
| Elongation % | 7.5 | 9.7 | 27.5 |
| Tensile Strength psi | 9,824 | 7,098 | 7,663 |

As can be seen, the elongation of the base polyphenylene sulfide resin is poor. The addition of the silane (Sample 3) slightly improves elongation. However, when compared with Sample 2 of Table 4, it can be seen that there is a substantial improvement in elongation using the combination of impact modifier and silane with respect to using the silane alone, and even substantially improved over using the impact modifier alone (Sample 1, Table 4).

EXAMPLE 5

The formulations shown in Table 7 were compounded and molded into test bars as described in Example 1.

TABLE 7

|  | Sample No. | |
| --- | --- | --- |
|  | 1 | 2 |
|  | Amount by Wt % | |
| Material |  |  |
| Fortron 214 | 79.2 | 79.2 |
| Kraton G1651 | 20 | — |
| SEP[1] - 1% Carboxyl | — | 20 |
| 21% Carboxyl |  |  |
| Aminosilane A-1100 | .5 | .5 |
| PETS | .3 | .3 |
| Physical Properties |  |  |
| Elongation % | 150% | 25% |

[1]Styrene-ethylene/butylene diblock copolymer - functionalized on styrene with carboxyl groups.

It has been found that in the unfilled formulation, using the triblock copolymer impact modifier, a substantial improvement in elongation results as compared with use of the diblock impact modifier.

What is claimed is:

1. A wire coated with a substantially concentric polyarylene sulfide resin coating, said coating comprising a blend of polyarylene sulfide and at least 5 wt. % based on the weight of the blend of a hydrogenated, conjugated diene/vinyl aromatic block copolymer having a total molecular weight of at least about 40,000, said coating having an elongation of at least 40%.

2. The coated wire of claim 1 wherein said block copolymer is ungrafted.

3. The coated wire of claim 1 wherein said vinyl aromatic is styrene.

4. The coated wire of claim 3 wherein said conjugated diene is butadiene.

5. The coated wire of claim 3 wherein said conjugated diene is isoprene.

6. The coated wire of claim 1 wherein said block copolymer comprises a triblock of styrene-butadiene-styrene.

7. The coated wire of claim 1 wherein said block copolymer comprises a triblock of styrene-ethylene/butylene-styrene.

8. The coated wire of claim 1 wherein said block copolymer is present in an amount of from about 10 to about 30 wt. % based on the weight of said blend.

9. The coated wire of claim 1 wherein said polyarylene sulfide is polyphenylene sulfide.

10. The coated wire of claim 9 wherein said polyphenylene sulfide is a linear homopolymer formed of p-phenylene sulfide units.

11. The coated wire of claim 9 wherein said polyphenylene sulfide comprises a polyphenylene sulfide copolymer formed of p-phenylene sulfide units and m-phenylene sulfide units.

12. The coated wire of claim 9 wherein said polyphenylene sulfide includes a cross-linking agent.

13. The coated wire of claim 1 wherein said blend further includes an alkoxy silane.

14. The coated wire of claim 13 wherein said alkoxysilane is an aminoalkoxysilane.

15. The coated wire of claim 14 wherein said aminoalkoxysilane contains at least one amino and two or three alkoxy groups.

16. The coated wire of claim 15 wherein said aminoalkoxysilane is aminopropyltriethoxysilane or aminopropyltrimethoxysilane.

17. The coated wire of claim 1 wherein said wire comprises a single strand wire, a plurality of strands or a cable.

18. The coated wire of claim 1 wherein said wire comprises copper or aluminum wire.

19. The coated wire of claim 1 wherein said coating is unfilled.

* * * * *